United States Patent [19]

Peterson et al.

[11] 4,386,367
[45] May 31, 1983

[54] SYSTEM AND METHOD FOR CONVERTING A NON-INTERLACED VIDEO SIGNAL INTO AN INTERLACED VIDEO SIGNAL

[75] Inventors: James R. Peterson; Douglas J. Doornink, both of Portland, Oreg.

[73] Assignee: Tektronix, Inc., Beaverton, Oreg.

[21] Appl. No.: 277,788

[22] Filed: Jun. 26, 1981

[51] Int. Cl.³ .............................................. H04N 5/02
[52] U.S. Cl. ..................................... 358/140; 358/152
[58] Field of Search ................................. 358/140, 152

[56] References Cited

U.S. PATENT DOCUMENTS 4,298,888  11/1981  Colles et al. ......................... 358/140

Primary Examiner—Richard Murray

Attorney, Agent, or Firm—Thomas J. Spence; John H. Bouchard

[57] ABSTRACT

A system and method for receiving an input bit stream defining a non-interlaced video image and for producing concurrently an output bit stream defining an interlaced representation of such image. Intermediate storage of every other input raster line in a first-in/first-out oriented memory permits the output of the interlaced signal to be interleaved with the receipt of the non-interlaced input, and the interleaving of the input and output operations permits the use of a memory module having a capacity less than that required to store a complete raster line of input information. Provision is also made for synchronizing the output operation to U.S. or European standards.

20 Claims, 4 Drawing Figures

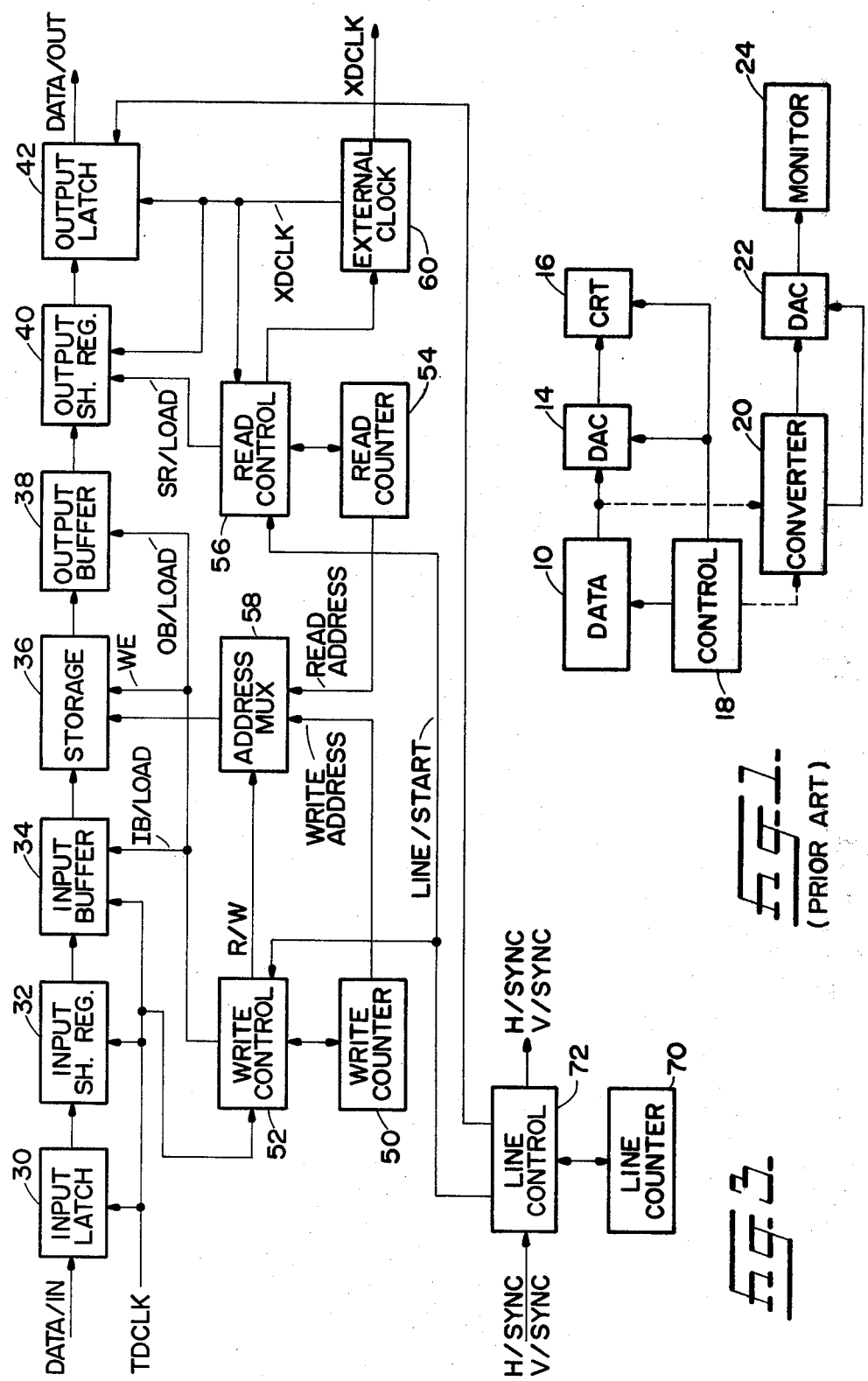

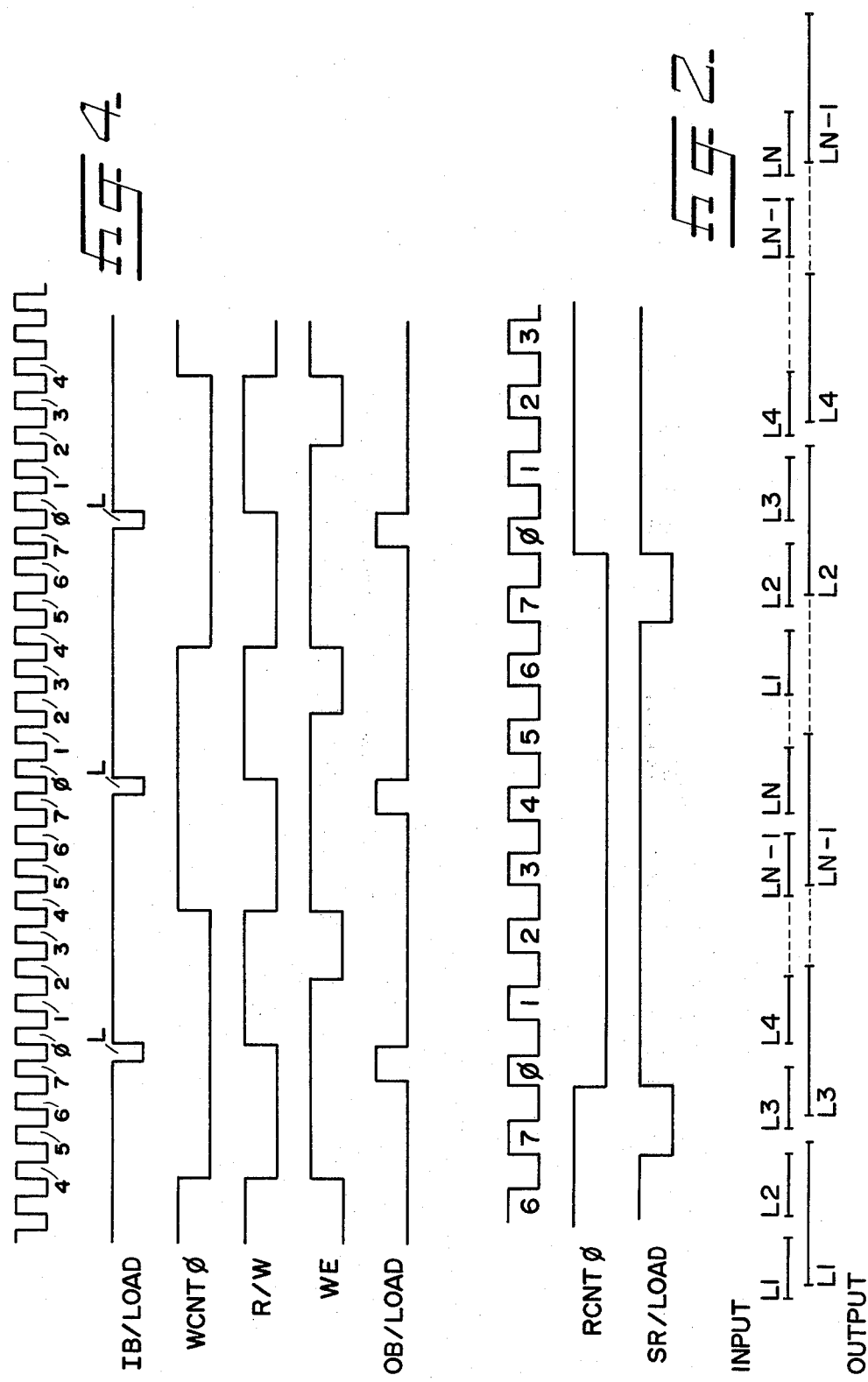

SYSTEM AND METHOD FOR CONVERTING A NON-INTERLACED VIDEO SIGNAL INTO AN INTERLACED VIDEO SIGNAL

BACKGROUND OF THE DISCLOSURE

The subject matter of the present invention pertains to means for converting a non-interlaced video signal, such as that produced by an information display system, into an interlaced form more compatible with a conventional television receiver.

In the field of information display, it is often convenient and advantageous to employ a non-interlaced video signal when producing a raster-scan image on, for example, the display screen of a cathode-ray tube. The use of such a signal, repeated at a frame rate equal to the interlaced field rate, permits the production of high-resolution graphic images without the flicker inherent in those parts of an interlaced image defined by a single point or a single horizontal line. Non-interlaced signals are also advantageous for producing permanent copies of a displayed image.

A problem occurs when it is desired to display a non-interlaced image simultaneously on both a high-resolution, high-bandwidth graphics device and a low-resolution, low-bandwidth monitor such as, for example, the aforementioned television receiver. In such a case, the non-interlaced signal must be converted to its interlaced equivalent before being transmitted to the lower bandwidth monitor. Depending on the particular monitor employed, it may also be necessary to make certain timing adjustments; for example, to convert from U.S. standards to European standards.

Known systems for converting a non-interlaced signal to interlaced form include those disclosed by Bockwoldt U.S. Pat. No. 3,947,826 and de Niet U.S. Pat. No. 3,832,487. In Bockwoldt, a non-interlaced video signal produced by successively scanning a pair of infrared detectors is transformed into alternating fields of interlaced lines by storing parallel channel data, one line-set at a time, in preselected storage devices and then reading the data out in a manner producing the desired interlaced signal. In de Niet, a non-interlaced signal from a television camera is converted to interlaced form by separating each frame of the signal into two fields, writing both fields into a storage device, and then reading the information back out in field sequence. The Bockwoldt system performs its transformation on a line-by-line basis, while the de Niet system operates on an entire frame of input information.

A disadvantage of the Bockwoldt system is that its interlaced signal contains two copies of each input scan line, a rather unconventional arrangement and one not readily applicable to the field of information display. A disadvantage of the de Niet system is that it requires a storage device capable of storing a full frame of image information. The de Niet system also requires its input and output devices, the camera and monitor, respectively, to have essentially the same bandwidths.

SUMMARY OF THE INVENTION

The present invention is directed to a system and method for converting successive frames of a non-interlaced video signal into successive fields of an interlaced video signal.

As used herein, the terms "frame" and "field" are understood to have the meanings generally ascribed to them in the field of video imagery; i.e., a frame comprises a plurality of raster lines defining a complete video image, whereas a field comprises a subset of the raster lines (usually all the odd lines or all the even lines) defining a given frame. A non-interlaced video image comprises successive frames of image information displayed one on top the other, while an interlaced image comprises successive fields displayed with their raster lines interlaced alternatingly with those of the immediate preceding field.

The system of the present invention comprises means for receiving an input signal defining successive frames of a non-interlaced video image and means for producing concurrently an output signal defining an interlaced version of the same image; the field rate of the output signal being equal to the frame rate of the input signal. Provision is also made for operating the system in timed synchrony with either an internal or an external timing source, and for conforming the output signal to either U.S. or European television standards.

A unique feature of the present invention is that transformation of the non-interlaced input signal into its interlaced equivalent is accomplished without requiring the intermediate storage of a full frame, or even a full line, of input information. This is made possible primarily through the use of a first-in/first-out (FIFO) oriented line buffer to process alternate lines of the input signal in a line-by-line manner.

In operation, every other line (e.g., even) of a first frame of input information is written into the line buffer at a first non-interlaced rate at the same time that it is read from the buffer at a second slower, interlaced rate. The process is then repeated for the alternate lines (e.g., odd) of the next successive frame of input information. In this manner, two fields (one frame) of interlaced output are produced for each two frames of input. The write and read operations are themselves interlaced, or, more accurately, interleaved, so as to permit each line of high-speed input information to be written into the buffer at the same time, effectively, as it is being read out at the slower rate. Because the buffer is of FIFO configuration, and because each interleaved read operation begins almost immediately after the start of its respective write operation, input information may be "wrapped around" the available storage space without danger of destroying previously stored information that has yet to be read out. Thus, the buffer device may have a storage capacity less than that required to store an entire line of input information.

As should be apparent, the system of the present invention is especially useful for converting the 60 frame-per-second non-interlaced signal commonly used in the field of high-resolution information display into the 60 field-per-second interlaced signal readily processed by a conventional television receiver. A principal advantage of such a system is that it permits conventional low-bandwidth television receivers to be used as remote monitors for displaying images generated by a high-bandwidth information display systems. A principal feature is that the conversion is accomplished without the requirement for a large and relatively complex buffer or other intermediate storage device capable of storing a full frame or field of input information.

It is, therefore, a principal objective of the present invention to provide an improved system and method for converting successive frames of a non-interlaced video signal into successive fields of an interlaced signal.

It is an additional principal objective of the present invention to provide an improved system and method for converting a non-interlaced video signal having a given frame rate into an interlaced video signal having a comparable field rate.

It is a further principal objective of the present invention to provide a system and method for accomplishing such conversion without requiring the intermediate storage of a full frame of image information.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a simplified block diagram of a prior art information display system interconnected with the conversion system of the present invention.

FIG. 2 is a sequence chart indicating the timing relationship between the input and output operations performed by the system of the present invention.

FIG. 3 is a block diagram of the system of the present invention.

FIG. 4 is a signal chart showing selected signals produced during the operation of the circuit of FIG. 3.

DETAILED DESCRIPTION OF THE PREFERRED EMBODIMENT

Referring first to FIG. 1, there is shown in simplified block-diagram form a conventional prior art display system comprising a source 10 of a digital signal defining successive frames of a non-interlaced refreshed raster-scan video image, a digital-to-analog converter (DAC) 14 for converting the digital signal to analog form, a cathode-ray tube (CRT) 16 for converting the analog signal into a visual image, and a source 18 of control signals for controlling the timed operation of the source 10, DAC 14, and CRT 16. Such systems are well known to the art and an understanding of their construction and operation may be assumed for purposes of complete disclosure. Also shown in FIG. 1, interconnected via dotted data and control lines with the prior art system, are the conversion system 20 of the present invention for converting the non-interlaced signal of the source 10 into its interlaced equivalent, a second DAC 22 for converting the interlaced signal to analog form, and a television-type monitor 24 for converting the analog signal into a visual image.

The non-interlaced signal received from the source 10 and the interlaced signal produced in response thereto are depicted in the sequence chart of FIG. 2 as a paired series of line segments L1, L2, . . . , Ln, with each line segment representing a single raster line of image information, and with each n line segments representing a complete image frame. Note that for each frame of the input signal, the output signal defines a single field of n/2 raster lines; the first field comprising, for example, the odd raster lines L1, L3, . . . , L(n-1), and the second field comprising the even raster lines L2, L4, . . . , Ln. Note also that the time duration of each output line, indicated by its relative length, is approximately twice the time duration of the corresponding input line. Thus, not only does the output signal define the interlaced equivalent of the non-interlaced input signal, but its frame rate (two fields per frame) is also one-half that of the input signal. Assuming a conventional non-interlaced input signal of 60 frames per second (50 in Europe), the output signal would comprise 30 frames per second (25 in Europe) of two fields each and be readily processable by a standard television-type monitor.

Referring now to the block diagram of FIG. 3, there is disclosed an exemplary embodiment of the conversion system 20 of the present invention. For ease of understanding, the system may be divided logically into two sections: a data section and a control section. The data section, extending across the top of the figure, includes an input latch 30, an input shift register 32, an input buffer 34, a storage device 36, an output buffer 38, an output shift register 40, and an output latch 42. As discussed in more detail below, that portion of the data section extending from the input shift register 32 through the output shift register 40 operates in a manner defining a first-in/first-out (FIFO) oriented storage system. In the simple embodiment of the figure, the latches 30 and 42 are one bit wide, the shift registers 32 and 40 are one bit wide by eight bits deep, the buffers 34 and 38 are eight bits wide, and the storage device 36 has a capacity of 64 words of eight bits each (512 bits total). Comparable components of other dimensions and capacities may, of course, be substituted to suit a particular circumstance without departing from the invention as disclosed. Moreover, as the state of the art permits, the FIFO system itself may be replaced by a single chip of integrated components.

The control section of the system of FIG. 3, extending across the lower two-thirds of the figure, includes a write counter 50 and write control circuit 52 for controlling information storage in synchrony with a first clock signal TDCLK, a read counter 54 and read control circuit 56 for controlling information retrievel in synchrony with a second clock signal XDCLK, an address multiplexer (MUX) 58 for alternately selecting certain write and read address signals produced by the two counters 50 and 54 for application to the storage device 36, a clock circuit 60 for producing the clock signal XDCLK, and a line counter 70 and line control circuit 72 for producing certain control signals necessary to synchronize system operation with the input signal frame rate.

Input signals necessary for system operation include an image signal DATA/IN comprising a digital bit stream defining successive raster lines of a non-interlaced refreshed raster-scan image, the clock signal TDCLK having a period corresponding to that of the picture elements (pixels) of the input image, and synchronization signals V/SYNC and H/SYNC announcing, respectively, the beginning of each frame and line of the input image. In the context of a digital image, a pixel equates to a dot or point of image information and in a monochromatic two-state system is represented by a single binary digit.

Each of the functional components shown in FIG. 3, with the exception of the three control circuits 52, 56, and 72, are conventional in nature and well-known to those persons skilled in the art, and it is their interconnection and timed operation, rather than their specific circuit configurations, that form the basis of the present invention. Moreover, the three control circuits are distinguished only by their disclosed operational characteristics; their actual circuit configurations may vary according to the desires and talents of the individual designer.

As indicated earlier, the primary purpose of the system of FIG. 3 is to convert successive frames of a non-interlaced digital video signal into successive fields of its interlaced equivalent. A special feature of the system is that the desired conversion is accomplished without requiring the intermediate storage of an entire image frame. In fact, storage requirements are less than those necessary to store a single line of image information.

Overall operation of the system of FIG. 3 is as follows. Alternate lines of the input image signal are received by the input latch 30, converted in eight-bit segments from serial to parallel form by the input shift register 32, and stored via the input buffer 34 into sequential storage locations of the storage device 36, all in synchrony with the clock signal TDCLK. Concurrent with its storage, the image information is read from the storage device 36, transferred via the output buffer 38 to the output shift register 40 for conversion from parallel to serial form, and made available at the output latch 42 for subsequent transmission to the intended receiver. Referring again briefly to the line segments of FIG. 2: during the receipt of a first frame, the odd lines are processed and the even lines are ignored; during the receipt of a next succeeding frame, the even lines are processed and the odd lines are ignored. The interleaving of the input and output functions necessary to accomplish the alternate field processing should be apparent from the figure.

Detailed operation of the system of FIG. 3 is best understood with reference to the signal chart of FIG. 4. At the top of that chart is shown the first clock signal TDCLK, and about midway down is shown the second clock signal XDCLK. As indicated earlier, the first clock signal TDCLK is produced external to the system of FIG. 3 and has a period corresponding to that of the input picture elements. The logical source for such a signal is the same source as that which provides the image signal. In a particular system reduced to practice, that source is a computer terminal display; hence, TD(CLK). The second clock signal XDCLK is produced internally by the clock circuit 60 and is used to synchronize the output operation with the timing requirements of an external display or device; hence, XD(CLK). Each of the signals appearing between TDCLK and XDCLK are in synchrony with TDCLK, and each of the signals appearing below XDCLK are in synchrony with the later signal. Except for certain starting considerations, there is no requirement for the two clock signals to be in synchrony with each other. For purposes of discussion, a TDCLK clock rate of 25 MHz and a XDCLK clock rate of 12.5 MHz are assumed. Also assumed is the RS 170 video convention.

Consider first the signals associated with the clock signal TDCLK. Assumed, but not shown, are the V/SYNC and H/SYNC signals announcing respectively the beginning of each frame and line of input information. As discussed below, the H/SYNC signal initializes, indirectly, the write and read counters 50 and 54, and the V/SYNC signal initializes, also indirectly, the line counter 70. The signal labeled IB/LOAD is a load signal produced by the write control circuit 52 once each eight cycles of the TDCLK signal to cause eight bits (pixels) of the image signal accumulating in the input shift register 32 to be transferred in parallel to the input buffer 34. The signal labeled WCNT∅ represents the least significant bit (LSB) of the current write address signal produced by the write counter 50. As should be apparent, the write counter 50 functions as a divide-by-eight counter to produce a new write address for each group of eight elements of the incoming image.

The signal labeled R/W is a read/write signal produced by the write control circuit 52 to cause the address MUX 58 to switch alternately between the write address produced by the write counter 50 and the read address produced by the read counter 54 (as described more fully below). A high state of the R/W signal indicates that a write address is being selected and a low state indicates that a read address is being selected. The signal labeled WE is a write enable signal produced by the write control circuit 52 to cause, during its low state, eight bits of image information to be transferred from the input buffer 34 to the storage location within the storage device 36 identified by the current write address signal. Lastly, the signal labeled OB/LOAD is a second load signal produced by the write control circuit 52 to cause, in its high state, eight bits of image information to be transferred from the storage location identified by the current read address to the output buffer 38. In the example of FIG. 3, each of the identified signals are one bit wide except the write and read data signals which are each eight bits wide.

Note that a memory-write operation is possible whenever the R/W signal is high and the WE and OB/LOAD signals are low, and that a memory-read operation is possible whenever the R/W signal is low and the WE and OB/LOAD signals are high. The high/low convention of the various signals of FIG. 4 is, of course, a design choice and it is the timing relationships between the signal changes that determines their significance. (For convenience of reference, the positive-going half-cycles of the clock signal TDCLK, as well as the clock signal XDCLK discussed more fully below, have been numbered sequentially in groups of eight to correspond to the 8-bit image segments being processed through the FIFO-oriented memory structure).

Turning now to those signals of FIG. 4 associated with the clock signal TDCLK, the signal labeled RCNT∅ represents the least significant bit (LSB) of the current read address signal produced by the read counter 54. Similar to the write counter 50, the read counter 54 is operated as a divide-by-eight counter to produce a new read address every eight cycles of the clock signal XDCLK. The signal labeled SR/LOAD is a load signal produced by the read control circuit 56 to transfer the eight bits of image information previously loaded into the output buffer 38 to the output shift register 40 for subsequent serial transfer to the output latch 42 under control of the clock signal XDCLK.

Referring to FIGS. 3 and 4, detailed operation of the system of the present invention is as follows. Under control of the clock signal TDCLK, information present at the input of the latch 30 is continuously gated through the latch, converted from serial to parallel form in the shift register 32, and presented to the input of the buffer 34. Responsive to the receipt of an H/SYNC signal indicating the start of new line of image information, and after a time sufficient to insure the presentation of valid information at the input of the buffer 34, the line control circuit 72 transmits a line/start signal to the write control circuit 52 and the read control circuit 56 causing both the control circuits and their respective counters 50 and 54 to be initialized. Convenient initial conditions for the two counters 50 and 54 are with their outputs set to zero, thus causing the succeeding write and read operations to begin at storage address zero. Other values could be employed as well.

Immediately upon receipt of the signal from the line control circuit 72, the write control circuit 52 generates the first IB/LOAD signal causing the information present at the output of the shift register 32 to be loaded into the buffer 34. The write control circuit 52 next issues the R/W signal selecting the eight-bit output signal from the write counter 50 as the first write address, and then issues the write enable WE signal causing the information previously loaded into the buffer 34 to be transferred to the storage device 36 and stored at the location specified by the write address. The write operation is repeated for each eight cycles of the clock signal TDCLK. Between each write operation, the write counter 50 is automatically incremented to produce a new write address. In this manner, successive eight-bit segments of the incoming image signal are stored sequentially in successive locations within the storage device 36. Repeated write operations will occur until the receipt of a new H/SYNC signal indicating the beginning of a new line of input information. As only every other line of each input frame is stored, the line control circuit 72 must be configured so as to issue a new line/start signal for only those lines meant to be stored; i.e., the odd lines of a first frame and the even lines of a next succeeding frame.

Note that during the times that input information is not being stored in the storage device 36, the R/W signal, the write enable WE signal, and the OB/LOAD signal are switched to their alternate states. Such condition causes the address MUX 58 to select the read address signal currently being produced by the read counter 54, prepares the storage device 36 for a read operation, and causes the information stored at the storage location identified by the read address to be transferred to the output buffer 38. Note also, with respect to the SR/LOAD signal discussed more fully below, that the read operation occurs periodically irrespective of whether the information transferred to the buffer 38 is used to produce a system output. The advantage of this is explained later. Note further that successive alternate lines of input information are continuously written into the storage device 36, one on top the other, completely independent of output operation.

As indicated earlier, receipt by the read control circuit 56 of the line/start signal produced by the line control circuit 72, causes the control circuit and its associated counter 54 to be initialized. Upon initialization, the control circuit 56 activates the clock circuit 60 and begins the periodic generation of the SR/LOAD signal shown in FIG. 4. Responsive to the SR/LOAD signal, the information previously transferred to the output buffer 38 is further transferred to the output shift register 40. Both the generation of the SR/LOAD signal and the updating of the read counter 54 occur in synchrony with the clock signal XDCLK produced by the clock circuit 60. Note that the clock signal XDCLK is also applied to the output shift register 40 and the output latch 42. Responsive to each cycle of the clock signal XDCLK, information stored in the shift register 40 is shifted out in serial fashion through the output latch 42 to form the system output signal. Every eight cycles of the clock signal XDCLK, the read control circuit 56 updates the read counter 54 to a next sequential read address and, after a time sufficient to permit the output buffer 38 to be loaded with the information previously stored at the storage location identified by the read address signal, issues a new SR/LOAD signal causing the information to be transferred from the buffer 38 to the shift register 40 and from there to the latch 42 as described above. In this manner, information stored in the storage device 36 at the TDCLK clock rate is simultaneously read from the storage device at the slower XDCLK rate. At the end of each output line, the XDCLK circuit 60 is stopped, and the system awaits reinitialization at the start of the next input line. Provision is made in the line control circuit 72 to issue line/start signals for only those lines, i.e., odd or even, of each input frame that are to be processed during the respective frame time. The line control circuit 72 also operates to pass through those control signals, such as V/SYNC and H/SYNC, and possibly blank/unblank, necessary to maintain the external monitor in synchronization with the output signal.

Assuming an XDCLK clock rate approximately one-half that of the TDCLK clock rate, the overlap between input and output operations will be substantially as shown in FIG. 2. As only every other line of the input is stored in the storage device 36, and as the write and read operations begin almost simultaneously, ample time is available to read the complete stored line before the next line to be stored is received. More importantly, as a substantial portion of each line is read from the system before the entire line is stored, the storage device 36 may be of a capacity less than that required to store a complete line, and the write operation may be permitted to wrap the line around the storage capacity so as to overlay the information already read out.

The minimum amount of memory capacity required to service an incoming bit stream is defined by the following mathematical expressions:

$$N \geq \frac{M_{ct} * 2}{P_{it}}$$

$$M \geq \frac{U}{N}\left(1 - \frac{P_{it}}{P_{ot}}\right)$$

where N and M define the dimensions of the memory array in bits and words, respectively, $M_{ct}$=memory cycle time (including delay inherent in associated interface circuitry), $P_{it}$=pixel input time, $P_{ot}$=pixel output time, U=number of pixels per image line and, $2*P_{it} \geq P_{ot} \geq P_{it}$. The second expression assumes that the read process begins at the first opportunity after the start of the write process, an assumption that may not be valid in all cases. For the example of the disclosure thus far, N equals the eight-bit input word length, $P_{it}/P_{ot}$ equals $\frac{1}{2}$, and U equals 640 (assumed). Therefore, from the second inequality, the storage device 36 need have a capacity no larger than 40 by 8. The memory actually used would probably measure 64 words by 8 bits, still less than the 640 bits per input line.

Returning again to the signal chart of FIG. 4, it will be noted that two cycles of the OB/LOAD signal occur for each cycle of the SR/LOAD signal. Only the information present in the buffer 38 at the time of the second SR/LOAD signal will be sent to the shift register 40. Since, in the example illustrated, the XDCLK clock rate is exactly one half the TDCLK clock rate, the same information, defined by the unchanged read address signal, is loaded into the output buffer 38 during both cycles of the OB/LOAD signal, and the double load operation is not particularly significant.

In the more general case, however, where the XDCLK signal may be somewhat slower or faster than one half the TDCLK signal—for example, in Europe where the bit rate is a function of 50 Hz, rather than 60

Hz it is possible for the timing between the OB/LOAD signal and the SR/LOAD signal to be such that information is being transferred from the storage device 36 to the output buffer 38 at the same time that it is also being transferred from the output buffer to the output shift register 40. Where it not for the fact that the output buffer had previously been loaded with the information meant to be transferred to the shift register, the coincidental reloading of the buffer could cause the transfer of invalid information. Such an event is effectively precluded by the frequent double loading of the output buffer during each cycle of the read operation. If correct information is loaded into the output buffer during the first cycle of the OB/LOAD signal, it will be transferred correctly notwithstanding the coincidental occurrence of the SR/LOAD signal with the second cycle of the OB/LOAD signal, and if misinformation is transferred during the first cycle of the OB/LOAD signal, it will be corrected by the second cycle.

Only those features of the present invention necessary to describe its novel operation have been disclosed in detail herein, and even those have been disclosed in terms of their operational characteristics. It will be recognized by those persons skilled in the art that certain other features such as starting and stopping, and accommodating different image dimensions and input and output pixel rates may be necessary to form a functioning system. Such features and the means for their implementation are well known to the art and well within the skill of a competent designer. It will also be recognized that the disclosed system is readily expandable to handle gray scale or color images merely by increasing the number and dimensions of certain components included within the system. For example, to process a 16-level gray scale image, it would be necessary to accommodate a four-bit wide input and output bit stream. The changes that would be necessary to the disclosed system in order to accomodate such bit streams will be apparent to those persons skilled in the art.

The terms and expressions which have been used in the foregoing specification are used therein as terms of description and not of limitation, and there is no intention in the use of such expressions, of excluding equivalents of the features shown and described or portions thereof, it being recognized that the scope of the invention is defined and limited only by the claims which follow.

I claim as my invention:

1. A system for converting successive frames of a non-interlaced video signal into successive fields of an interlaced video signal, said system comprising:
   (a) input means for receiving an input signal defining successive frames of a non-interlaced raster-scan video image, each said frame comprising plural raster lines of video information;
   (b) output means for producing, concurrent with the receipt of a first frame of said input signal, a first output signal defining every other raster line of said first frame, and, concurrent with the receipt of a next succeeding frame of said input signal, a second output signal defining the alternate raster lines of said next succeeding frame;
   (c) the receipt by said input means of a portion of said input signal defining every other raster line of said first frame being interleaved with the production of said first output signal by said output means defining said every other raster line of said first frame; and
   (d) the receipt by said input means of a portion of said input signal defining the alternate raster lines of said next succeeding frame being interleaved with the production of said second output signal by said output means defining said alternate raster lines of said next succeeding frame, whereby said system is operated in a first-in/first-out manner.

2. The signal conversion system of claim 1 wherein said first output signal defines a first field of an interlaced video signal and wherein said second output signal defines a second field of said interlaced video signal.

3. The signal conversion system of claim 2 wherein said first field comprises the odd raster lines of said first input frame and wherein said second field comprises the even raster lines of said next succeeding frame.

4. The signal conversion system of claim 2 wherein said input signal is received at the rate of N lines per second and wherein said output signal is produced at a rate less than N lines per second.

5. The signal conversion system of claim 1 wherein said first and second output signals define in combination an interlaced representation of said input image.

6. The signal conversion system of claim 5 wherein the field rate of said combined output signals corresponds to the frame rate of said input signal.

7. The signal conversion system of claim 1 wherein said input means includes means for receiving a raster line of input information at a first rate, and wherein said output means includes means for transmitting said raster line at a second, slower rate.

8. The signal conversion system of claim 7 wherein said output means includes means for initiating the transmission of said raster line concurrent with its receipt.

9. The signal conversion system of claim 1 wherein said input signal is received at the rate of 60 frames per second and wherein said output signal is produced at the rate of 60 fields per second.

10. The signal conversion system of claim 9 wherein said output rate is N/2 lines per second.

11. The signal conversion system of claim 1 wherein said input means includes memory means for storing temporarily at least a part of an input raster line of video information, and wherein said output means includes means for reading from said memory means a first portion of said raster line during the time that a second portion of said raster line is being stored.

12. The signal conversion system of claim 11 wherein said memory means is operated in said first-in/first-out manner such that said second portion of said raster line succeeds in time said first portion.

13. The signal conversion system of claim 11 wherein said memory means has a storage capacity less than that required to store an entire raster line of said input information.

14. The signal conversion system of claim 11 wherein said first portion of said raster line is read from said memory means at a rate slower than that with which said second portion is stored.

15. A method of converting successive frames of a non-interlaced video signal into successive fields of an interlaced video signal, said method comprising the steps of:
   (a) receiving an input signal defining successive frames of a non-interlaced refreshed raster-scan video image;

(b) producing, concurrent with the receipt of a first frame of said input signal, an output signal defining a first field of an interlaced representation of said video image, and producing, concurrent with the receipt of a next successive frame of said input signal, an output signal defining a next successive field of said interlaced representation of said video image;

(c) interleaving the receipt of a portion of said input signal defining a first field of said first frame of said input signal with the production of said output signal defining said first field of said interlaced representation of said video image; and (d) interleaving the receipt of a portion of said input signal defining a next successive field of said next successive frame of said input signal with the production of said output signal defining said next successive field of said interlaced representation of said video image.

16. The signal conversion method of claim 15 wherein the field rate of said output signal corresponds to the frame rate of said input signal.

17. The signal conversion method of claim 15 wherein each said frame of said input signal comprises a plurality of raster lines of image information, and wherein said first field of said output signal comprises every other raster line of said first frame and said next succeeding field comprises the alternate raster lines of said next succeeding frame.

18. The signal conversion method of claim 15 wherein said input signal is received at the rate of N lines per second and said output signal is produced at the rate of N/2 lines per second.

19. The signal conversion method of claim 15 wherein said step (a) includes receiving a raster line of said input video image at a first rate and wherein said step (b) includes producing a raster line outputing said raster line at a second slower rate.

20. The signal conversion method of claim 19 wherein said step (b) further includes outputting a first portion of said raster line during the time that a second portion of said line is being received.

* * * * *